United States Patent [19]

Mengeringhausen

[11] 4,380,996
[45] Apr. 26, 1983

[54] ROOF CONSTRUCTION FOR BUILDINGS

[75] Inventor: Max Mengeringhausen, Wurzburg, Fed. Rep. of Germany

[73] Assignee: MERO-Raumstruktur GmbH & Co., Wurzburg, Fed. Rep. of Germany

[21] Appl. No.: 259,141

[22] Filed: Apr. 30, 1981

Related U.S. Application Data

[63] Continuation of Ser. No. 28,356, Apr. 9, 1979, abandoned.

[30] Foreign Application Priority Data

Apr. 8, 1978 [DE] Fed. Rep. of Germany ....... 2815268

[51] Int. Cl.³ ........................... F24J 3/02; F28F 9/00
[52] U.S. Cl. ................................. 126/450; 126/451; 165/68; 248/237
[58] Field of Search ............... 126/450, 451, 417, 418; 165/67, 68; 52/27, 38; 248/348, 232, 237

[56] References Cited

U.S. PATENT DOCUMENTS

| | | | |
|---|---|---|---|
| 811,274 | 1/1906 | Carter | 126/451 |
| 953,981 | 4/1910 | Spring | 248/237 |
| 2,405,877 | 8/1946 | Delano | 126/451 |
| 2,785,695 | 3/1957 | Carey | 126/451 |
| 2,987,961 | 6/1961 | Cotton et al. | 126/451 |
| 3,500,430 | 3/1970 | Rex | 52/27 |
| 3,521,966 | 7/1970 | Archer | 126/451 |
| 3,916,871 | 11/1975 | Estes et al. | 126/450 |
| 4,056,313 | 11/1977 | Arbogast | 126/451 |
| 4,083,357 | 4/1978 | Fischer | 126/451 |
| 4,184,482 | 1/1980 | Cohen | 126/451 |

FOREIGN PATENT DOCUMENTS 2399629 4/1979 France ............................. 126/450

Primary Examiner—Daniel J. O'Connor
Attorney, Agent, or Firm—Jacobi, Siegel, Presta, Marzullo & Aronson

[57] ABSTRACT

A roof construction for buildings comprising a framework of bars and junctions, the bars being arranged in sets which are located in several mutually intersecting planes that are group-wise substantially parallel. One group of a set of bars extends in substantially parallel planes of the framework and is aligned independently of building orientation in the direction of the highest elevation of the sun. Solar collectors are mounted on these sets of bars.

9 Claims, 22 Drawing Figures

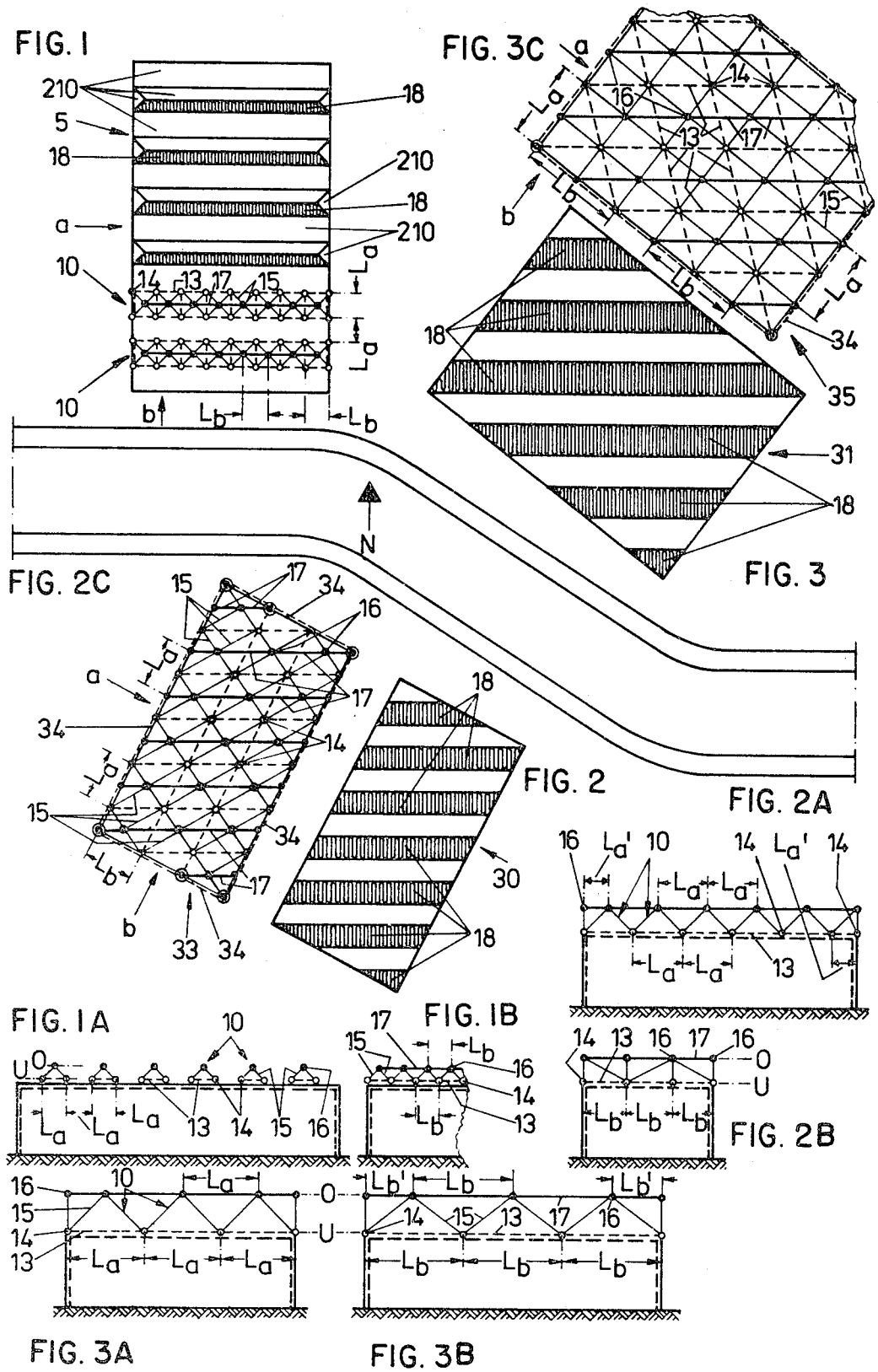

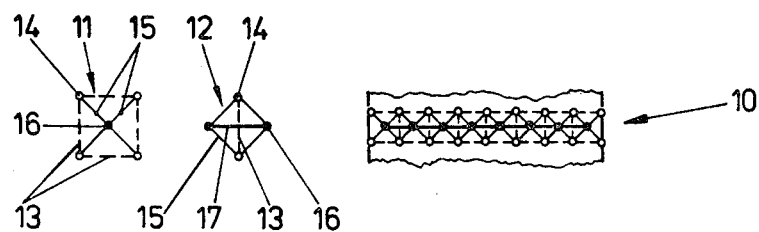
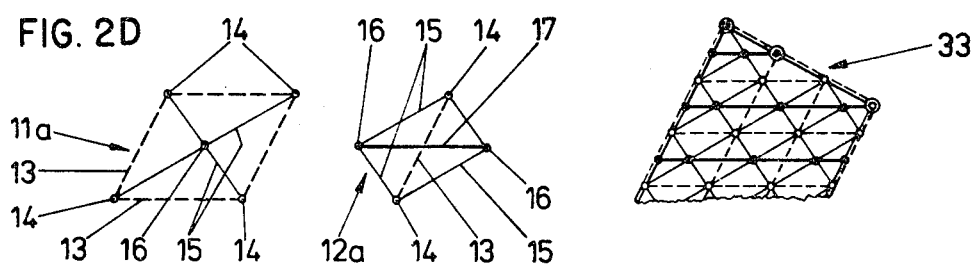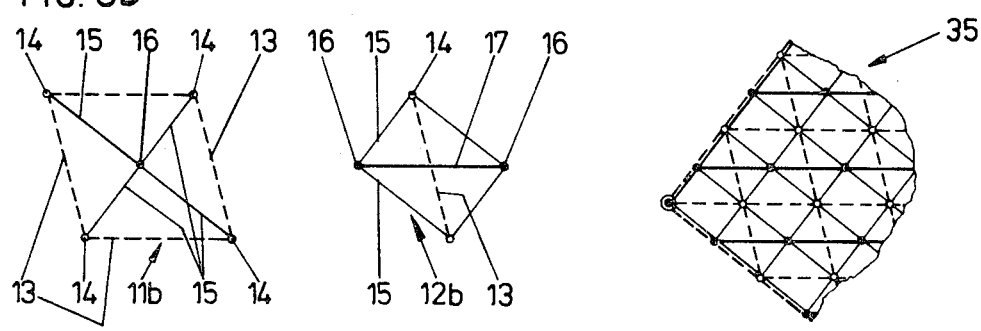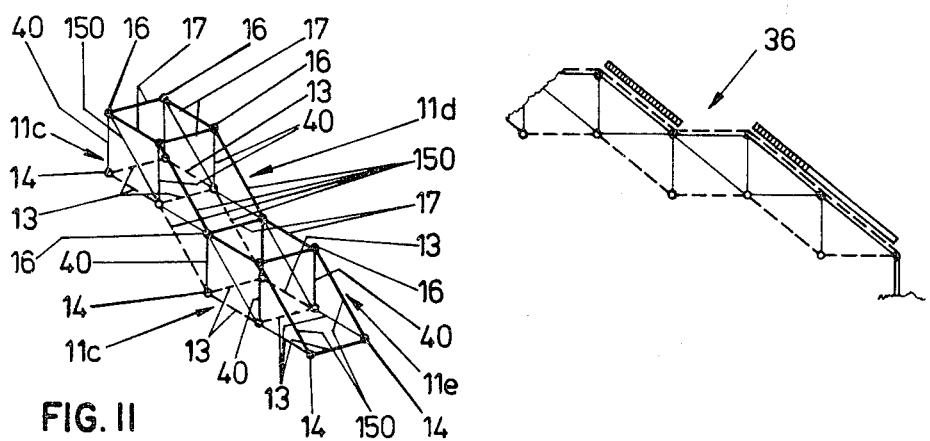

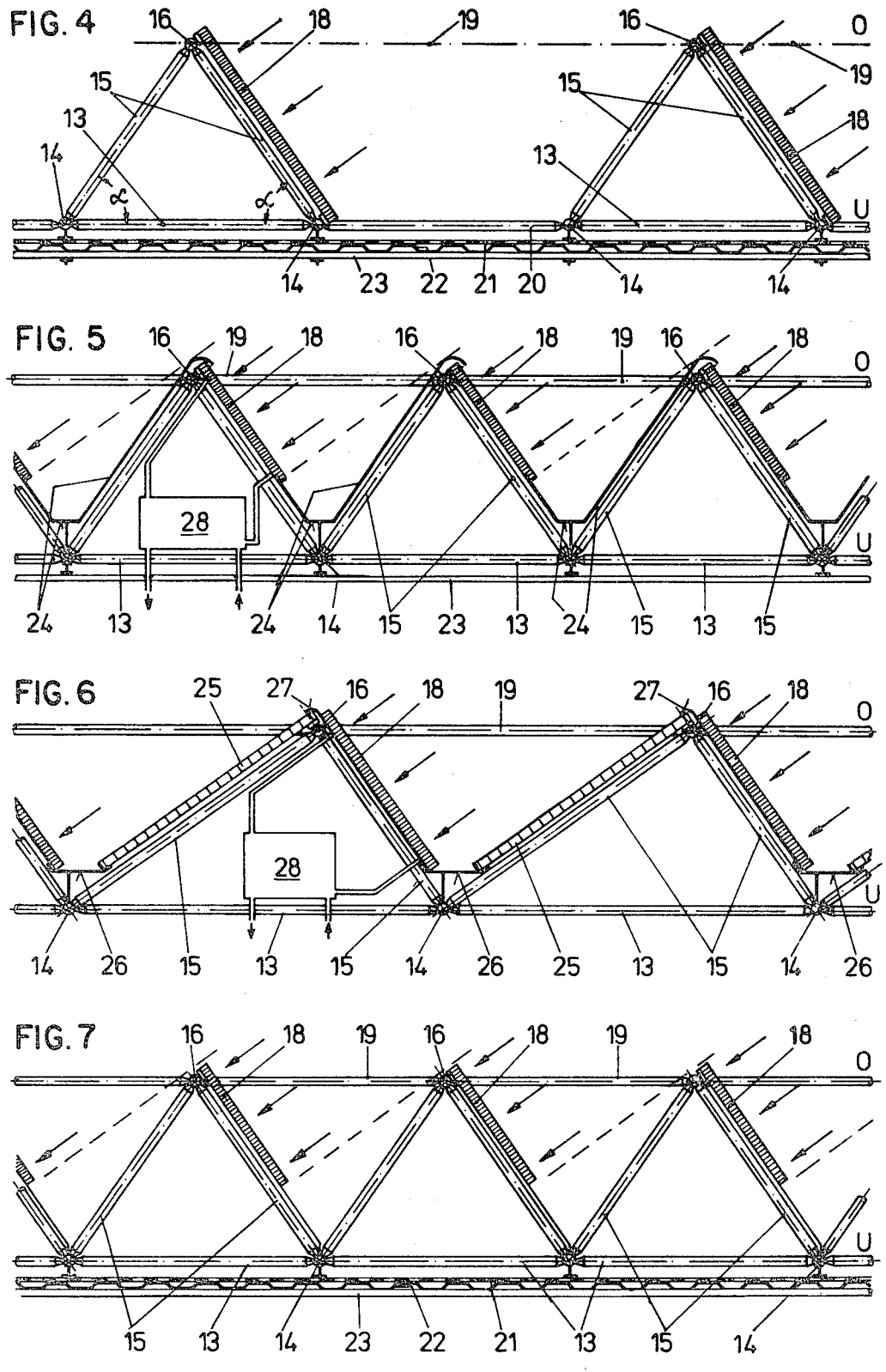

ROOF CONSTRUCTION FOR BUILDINGS

This is a continuation of application Ser. No. 28,356, filed on Apr. 9, 1979, now abandoned.

BACKGROUND OF THE INVENTION

This invention relates to roof constructions for buildings and, in particular, to such constructions with wide spans, consisting of three-dimensional lattices or frameworks in which the bars are arranged in clusters in several mutually intersecting planes, the planes being group-wise parallel.

Such frameworks are widely known in planar construction, and increasingly also for domes or gabled roofs or for individual forms extending in several planes. They have been used so far as supports for space-sealing roof elements of the arbitrary type.

The object of the present invention is to exploit solar energy by means of frameworks of the above type. As solar heat is free, the economical efficiency of such utilization practically depends only on the investment in the solar equipment. Accordingly it is important to minimize to the utmost the installation costs of the solar collectors proper and also for the integration of their accessories.

It is already known to arrange solar collectors for solar heating on the surface of slanted (gabled or single-slant) roofs resting on conventional lumber construction, and to integrate them into the roofing material over said lumber. However, steep gabled roofs sloping advantageously with respect to solar irradiation are impossible for wide-span buildings (arenas, plants, etc.). Therefore, flat roofs or at least truncated domes or low-height barrel roofs are used for such wide-span buildings. As regards flat roofs, it has been possible so far to erect solar collectors at a slant above the roofing only by using special mounting means for the purpose of receiving a maximum of solar heat. In such cases, therefore, high costs are added to the supporting roof construction and roofing by the costly mounting means for the solar collectors. To the extent that the building seen in top view does not face toward the sun at high noon (toward the south in the northern hemisphere), such mounting means require rotation with respect to the axes of the building in order to achieve the most advantageous position of the solar collectors for heat absorption. While theoretically quite simple, this does cost a lot of money in practice.

SUMMARY OF THE INVENTION

A special object of the present invention, therefore, is to create a roof design using a three-dimensional framework for buildings allowing for the integration of the solar collectors into the supports so that special or additional posts or fastening means for the solar collectors are eliminated and so that, in any circumstance, i.e., for arbitrary building orientation, the three-dimensional framework supports the solar collectors so they are in an advantageous position with respect to the main direction of solar irradiation (in the northern hemisphere, therefore, at a raised height with respect to the horizontal, depending on latitude, and pointing south). In a further step the roofing used for room enclosure and climatization is included in such integration.

This problem is solved by the present invention for a roof design of the initially described kind in that a group of sets of bars arranged in parallel planes points independently of building orientation to the highest elevation of the sun and in that solar collectors are directly mounted in or on these sets of bars. Because of this integration of the solar collectors into the three-dimensional framework, additional constructions involving posts or girders can be advantageously eliminated. Furthermore, the solar collectors can be directly integrated into the roofing material without an appreciable rise in the upper chord plane (O) taking place.

In the previously conventional gabled roof designs, the effectiveness of the solar collectors depends decisively on the essentially southward orientation of one of the surfaces. In the present invention, on the other hand, the framework can be mounted independently of building orientation, so that the solar collectors always assume an optimum orientation with respect to the main axis of the sun's rays. As any additional support construction for the solar collectors is eliminated, and in view of their optimal orientation, the proposal of the invention offers a universal teaching, i.e., one applicable to any building no matter what its orientation, for achieving an economically operating solar roof facility.

Further advantageous embodiments are made clear in the dependent claims of this application.

As is known, the design principle for three-dimensional frameworks arranges bars and junction elements in such manner that the bars are arrayed in several (at least three) sets located in parallel and mutually intersecting planes. Each bar is located on the intersection of planes containing at least two sets of bars and each junction is located at the common intersection of planes containing three sets of bars. It was commonplace practice, therefore, when using such frameworks to arrange at least one of its supporting main axes when seen in top view in such manner that the entire three-dimensional framework was placed symmetrically on the building (i.e., to date and for a square lattice in the framework, the lattice axes have been laid parallel to the sides or to the axes of symmetry of a rectangular building). The present invention departs from this mode of array and offers a teaching for trueing the framework with the sun for arbitrary building orientations—accordingly, also for those buildings lacking a north-south orientation, and this with a very economical solution. As the deformation of a regular framework can always be implemented with a minimum number of bars of different lengths where the frameworks considered herein are concerned, the great economy found in practice when using the regular ones is thus maintained (where the attempt will be made to use the fewest possible variations in bar lengths and junctions with varying positions of the connecting bores).

Further advantages when integrating solar collectors into a three-dimensional framework according to the invention are obtained by mounting accessory equipment for exploiting the solar energy in the space bounded by the framework and next to the solar collectors, and especially when adjusting the space-defining elements to the principles of the invention.

The invention is described below in greater detail in relation to the drawings of illustrative embodiments.

BRIEF DESCRIPTION OF THE DRAWINGS

FIG. 1 is a top plan view of a building with a framework roof construction consisting essentially of parallel and spaced triangular trusses, and partly with roofing and solar collectors;

FIGS. 1a and 1b are elevational views of the building with the roof construction seen in the direction of arrows "a" and "b", respectively, of FIG. 1;

FIG. 1c illustrates top views of the elementary cells in the shape of a semi-octahedron and a tetrahedron from which the triangular trusses of FIG. 1 are build;

FIG. 2 is a top view of a roof construction approximately half covered by roofing and solar collectors for a building which does not face north-south;

FIGS. 2a and 2b are elevational views of the building with the roof construction of FIG. 2, seen in the direction of arrows "a" and "b", respectively, of FIG. 2c;

FIG. 2c is a top view of the roof construction of FIG. 2, without the roofing and the solar collectors, to show the deformed framework thereof;

FIG. 2d illustrates top views of the elementary cells in the shape of a deformed semi-octahedron and a tetrahedron which build up the parallel mutually bounding triangular trusses of the three-dimensional framework of FIG. 2c, each time in the axial direction;

FIG. 3 is a top view similar to that of FIG. 2 of a building which has an orientation other than north-south;

FIGS. 3a and 3b are an elevational view in the direction of the arrows "a" and "b", respectively, of FIG. 3c;

FIG. 3c is a top view of a roof construction of the building of FIG. 3, without roofing and solar collectors, to better show the deformed framework of this embodiment of the invention;

FIG. 3d illustrates top views of the elementary bodies similar to those of FIG. 2d;

FIG. 4 is a partial elevational view of the roof construction of FIG. 1a on an enlarged scale, with monoaxially clamped triangular trusses, which are arrayed offset with respect to other trusses behind or in front of them;

FIG. 5 is a partial elevational view of the roof construction, for instance, of FIGS. 2a or 3a, on an enlarged scale;

FIG. 6 is a partial elevational view similar to that of FIG. 5, of a roof construction built up from triangular trusses of asymmetric cross-section;

FIG. 7 is a partial elevational view of a roof construction similar to that of FIG. 5, with a framework clamped along two axes and with a roofing arrangement underneath the framework;

FIG. 11 is a partial view of the elementary cells which build up the framework of the roof construction of FIGS. 8, 9 and 10, achieved by deforming the elementary cells of the regular cubic design.

DESCRIPTION OF THE PREFERRED EMBODIMENTS

Figure 8:
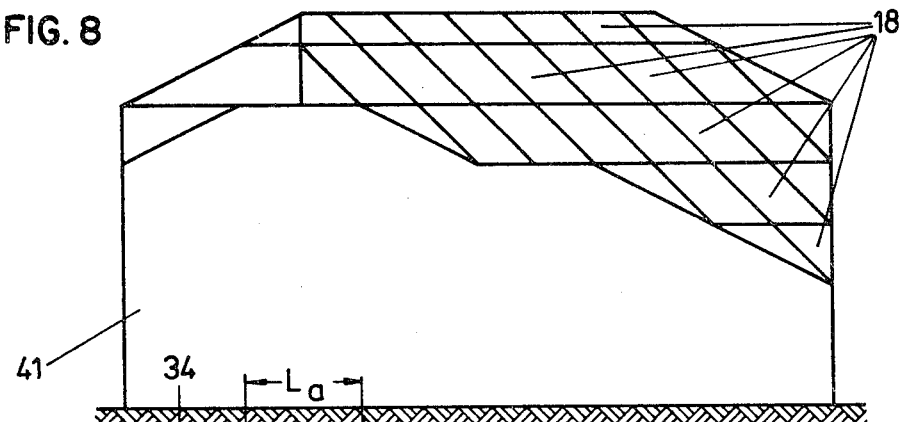
FIG. 8 is a front elevational view of a building with a stepped or terraced roof construction, representing a further embodiment of the invention and supporting the solar collectors on the slanted, southward surfaces.

The building 5 with a rectangular top view shown in FIG. 1 is oriented precisely along the north-south direction and comprises a roof of which the support consists of a three-dimensional framework in the form of parallel, uniaxially stressed triangular trusses 10 which are mutually spaced a distance $L_a$ in the plane U of the lower chord in the north-south direction, the spacing $L_a$ of the triangular trusses. The triangular trusses 10 consist individually of the elementary cells 11 and 12 (FIG. 1c), the elementary cell 11 representing a semi-octahedron and elementary cell 12 a tetrahedron. The elementary cell 11 individually consists of four bars 13 connected at their ends by junctions 14 to which are connected further four diagonal bars 15 connected in turn at their upper ends by junctions 16. The bars 13 form a square grid or lattice with a lattice separation of $L_a$. The elementary cells 12 located between adjacent elementary cells 11 consist of junctions 14, bars 13 and diagonal bars 15, also of junctions 16 from adjacent elementary cells 11, bars 17 extending in the east-west direction between junctions 16. Accordingly, the bars 13 are located in the plane U of the lower chord, while bars 17 are located in the plane O of the upper chord. The arrangement of this embodiment is such that the length $L_b$ of bars 17 equals that of bars 13 in the plane U of the lower chord. Again, the diagonal bars may be of a corresponding length, so that one length for all the bars will suffice for the entire framework.

The above arrangement and design of the triangular trusses 10 results in the diagonal bars 15 being arrayed as groups of sets of bars in parallel planes subtending an angle alpha with the horizontal and pointing midway in the direction of the highest sun (southward). Solar collectors 18 are mounted above these southward pointing sets of diagonal bars 15, as shown also in FIG. 4. As can be seen in FIG. 4, solar collectors 18 are bolted onto the junctions 16 in the plane O of the upper chord and to the junctions 14 in the plane U of the lower chord. FIG. 4 further shows that the triangular trusses 10 can also be mutually connected by rods 20 transversely to their main axes. The spacings between the parallel triangular trusses 10 in each case are so selected that even for the sun at its lowest, shade formation by neighboring solar collectors will be avoided or at the least kept trivial. Again, FIG. 4 shows that in such a three-dimensional framework the roofing 21 can be suspended together with a supporting trapezoidal plate or sheet metal 22 and a heat barrier 23 below the statically effective triangular trusses 10. Alternatively, the northward, westward and eastward pointing sets of diagonal bars 15 and the spaces between the triangular trusses 10 may be provided with a roofing 210.

As regards the embodiment of FIG. 5, this is a bi-axially clamped framework with upper chord bars 19. In this instance, deviating from the above embodiment, the triangular trusses are so arrayed directly next to one another that the diagonal bars 15 between the plane O of the upper chord and the plane U of the lower chord of adjacent triangular trusses are connected at the bottom to common junctions 14. To prevent in this case forming a shadow on the solar collectors 18, or at least to reduce it to a minimum, the collectors are shortened at their bottoms with respect to the embodiment of FIG. 4. This variation of the invention furthermore shows roofing 24 in FIG. 5 which is so mounted above the sets of diagonal bars 15 that a passable rain drain is obtained between all of the triangular trusses, the solar collectors 18 being mounted above those rain drains or gutters yet below the upper boundary of the roofing 24, and in such a manner that said collectors offer the most advantageous angle with respect to the main beam of solar irradiation. Accordingly, in this instance the solar collectors 18 are integrated in the roofing 24 whereas the heat barrier 23, consisting for instance of laminations, is suspended from the triangular trusses similarly to the embodiment of FIG. 4.

The embodiment shown in FIG. 5 further comprises triangular trusses of symmetrical cross-section, the roofing 24 opposite the solar collectors, if appropriate, being made opaque.

In FIG. 6, to the contrary, the triangular trusses are asymmetrical in cross-section, as is usually the case for instance in shed roofs. The solar collectors 18 are mounted on the sets of diagonal bars 15 which point in the direction of the highest sun (southward) and which are shorter than the neighboring sets of bars 15 above which are mounted transparent roof slabs 25 or the like, where appropriate incorporating a heat barrier, whereby the space below the framework is illuminated by diffuse daylight without undue glare and direct illumination by solar heat. The roof slabs 25 and solar collectors 18 are connected at their lower edges by the rain drains 26, whereas provision may be made for plates or sheet metal 27 at the upper edges of the solar collectors to overlap the slabs 25. Be it further noted that the connecting bars 19 between the triangular trusses are of the same length as bars 13 in the plane U of the lower chord.

The embodiment of FIG. 7 essentially corresponds to that of FIG. 4, except that in this case the triangular trusses are arrayed directly against one another by means of upper chord bars 19 and that solar collectors 18 shortened at the bottom are mounted above the sets of diagonal bars 15 pointing in the direction of the highest sun (southward).

Accessory equipment 28 may be incorporated, furthermore, within the three-dimensional framework or the triangular trusses, together with the solar collectors 18, as schematically indicated in FIGS. 5 and 6. The solar energy captured by the solar collectors 18 may be delivered by these accessories for room heating, e.g., by these accessories taking in the air from below, heating it and then releasing it below again. Inversely, the energy delivered by the solar collectors can also be used, for instance, in the presence of absorber facilities to cool the air in the room below the three-dimensional framework. The combination of accessories within the framework is especially advantageous also because only short connections are required between the solar collectors on one hand and these accessories on the other. Accordingly, a particularly economical implementation is possible while the operation of the entire equipment is also economical. Furthermore, it is immediately feasible to integrate such combinations of accessories and collectors retroactively, as indicated by FIGS. 5 and 6.

Whereas the building 5 of the embodiment of FIG. 1 is oriented north-south and the framework is mounted symmetrically on it in such manner that the one-half of the set of diagonal bars 15—above which are mounted the solar collectors 18—satisfactorily points south, the conditions relating to the buildings 30 and 31 of FIGS. 2 and 3 are different, as these, for instance, because of the direction of the street, subtend an angle with the north-south direction.

According to the theory of the three-dimensional frameworks, the socalled "regular frameworks" (for instance with a square base grid) are the basis of all such designs. It is also known to build the socalled "derived three-dimensional frameworks" from the "regular" ones, for instance by changing their height or by forming a rectangular grid from a square basic one due to the transforming of the axial direction. These steps, however, do not automatically and easily lead to an optimal solution as regards the orientation of the building in FIGS. 2 and 3. On one hand, in order to line up a group of sets of diagonal bars extending in parallel planes toward the highest sun (southward), above which then the solar collectors can be mounted, and on the other hand in order to make do with a minimum number of bars of different lengths and junctions with connecting bores in different places, so that the economy of the three-dimensional framework as a roof support is retained, a regular framework is deformed in a special manner in accordance with the present invention as regards the cases mentioned above.

A framework 33 acting as the roof support for the building 30 shown rectangular in top view of FIG. 2 is deformed in a special manner as indicated in FIG. 2c so that part of diagonal bars 15 extending in parallel sets is pointing in the direction of the highest sun (southward). This results in a parallel alignment of the bars 17 in the upper chord axes, which run from east to west. The junctions 14 and 16 together with the grid lines 34 parallel to the edges of the building and the equal spacings in each axis thereby form a grid. However, the spacings from one axis to the next are different in this case. Looked at in detail, the framework 33 consists of the parallel triangular trusses 10 (FIG. 2a), which are immediately adjoining. The elementary bodies 11a and 12a of each triangular truss also comprise four bars 13 in the plane U of the lower chord, which are connected by junctions 14 with one another and also with diagonal bars 15, which are each connected to a junction 16 in the plane O of the upper chord. In turn, the bars 17 in the plane O of the upper chord connect the junctions 16 of neighboring elementary cells 11a. In contrast to the embodiment of FIG. 1, the elementary cells 11a and 12a are deformed, whereby the elementary cells 11a assume not a square, but rhombic basic surface. All the junctions of the framework 33, however, as already stated rest on a grid of which the grid lines 34 are parallel to the edges of the building 30. The grid spacing $L_a$ remains the same in the principal axis of the framework except for the end spacings $L'_a$ and even the grid spacing $L_b$ along the transverse axis of the framework is uniform, though different from $L_a$. Because of these grid spaces between the junctions 14 and 16 in the plane of the lower chord or upper chord, the framework can be implemented despite the cited deformation with a minimum of different bar lengths and junctions with varyingly located connection bores. Solar collectors 18 can be emplaced in optimal manner above the sets of diagonal bars 15 properly facing south. The roofing can be simply suspended from the framework as indicated for instance in FIG. 7.

The embodiments of FIGS. 3 through 3d essentially correspond to those of FIGS. 2 through 2d. The framework 35 forms the roof support for building 31 and consists in this case also of parallel, adjoining triangular trusses 10, again the framework being so deformed that the bars 13 of the elementary cells 11b bound not a square, but a parallelogram. Junctions 14 and 16 form a grid with the grid lines 34 running parallel to the edges of the building 31, a constant grid spacing $L_a$ obtaining transversely to the building and a constant grid spacing $L_b$ in its longitudinal direction, in both cases across the entire housing facade. Thereby, it becomes possible in this example also of making do with a minimum number of bars of different length and different junctions with varyingly located connection bores. The solar collectors 18 are mounted above the south-facing parallel sets of diagonal bars 15. As in the preceding embodiment, the bars 17 extending in parallel in the plane O of the upper chord are of the same length as those bars 13 mounted in plane U of the lower chord. The roofing can be implemented as shown in FIG. 7.

Unlike the deformed frameworks 33 and 35 on buildings 30 and 31, respectively, of FIGS. 2 and 3, which are derived from the elementary cells of semioctahedral and tetrahedral shapes, the spatially deformed framework 36 of the embodiment of FIGS. 8 through 11 is derived from the cubic elementary cells 11c and 11d and the cubic diagonal segments 11e. The framework 36 rests on the building walls 37 by means of the elementary cells 11e in the form of cubic diagonal segments. A triangular truss 38 is located only in the top of the roof. In order to achieve an efficient solar installation in this case, it is important that as much as possible of the roof surface be in a favorable orientation with respect to the sun. Framework 36, furthermore, must form the support not only for the solar collectors 18 but also for the roofing 39. The optimal orientation of the solar collectors 18 is obtained by so designing the three-dimensional framework that sets of external diagonal bars 150 located in parallel planes point in the direction of the highest sun (southward). The solar collectors 18 are mounted above those external diagonal bars 150. As clearly shown in FIG. 10, the sets of external diagonal bars 150 are interconnected by horizontal bars 17, whereby a sequence of steps of sets of bars is formed. Passable plates or roof elements further may be mounted on the horizontal sets of bars between the solar collectors 18. In this manner, it is easy to have access to the solar collectors 18 for monitoring purposes.

Figure 9:
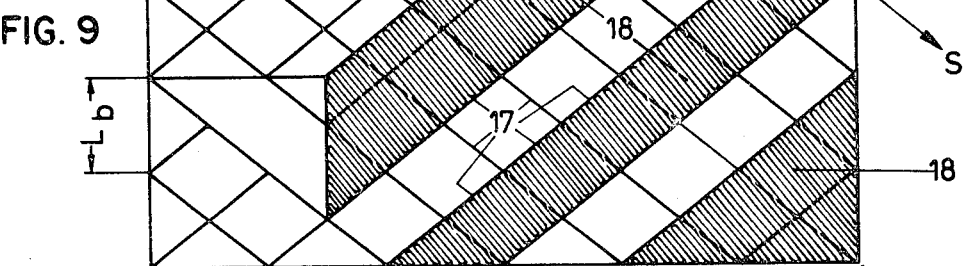
FIG. 9 is a top plan view of the roof construction of FIG. 8, partly broken away to show the deformed three-dimensional framework.
Figure 10:
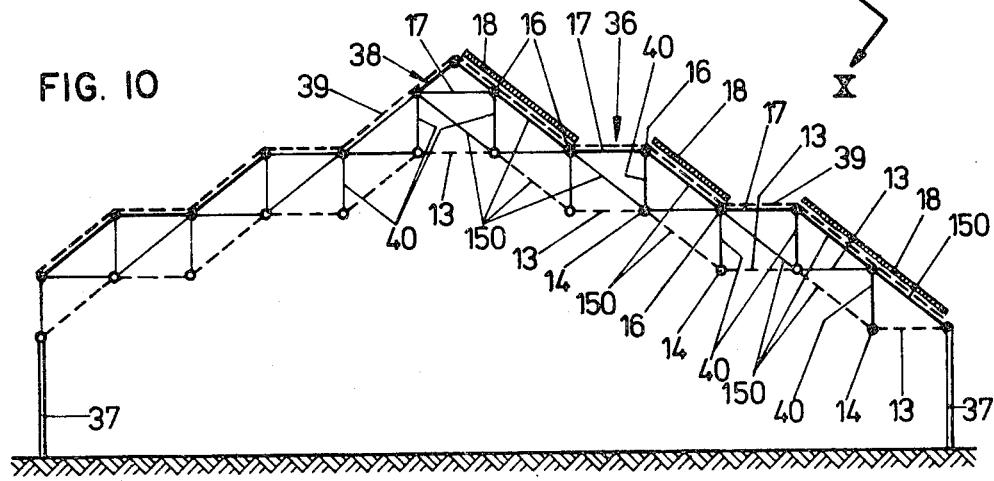
FIG. 10 is a view in section taken substantially along line X—X of FIG. 9.

FIG. 9 illustrates that in this instance also the building 41, which is rectangular in plan view, is oriented at an angle to the north-south axis. Therefore, the three-dimensional framework must be mounted asymmetrically with respect to the building and at the same time it must be derived from a regular cubic framework in order on one hand to align part of the external sets of diagonal bars 150 toward the south with parallel upper chord axes, and on the other hand to arrange the junctions 14 and 16 in a grid of which the grid lines 34 run parallel to the building contour and of which the grid spacings $L_a$ and $L_b$ are each constant for its building axis. Accordingly, part of the bars 17 in the upper chord lines up approximately in the east-west direction, the remaining bars 17 being oblique to them and aligned along the north-south line. The elementary cells 11c and 11d as well as the elementary cells 11e have a base-rhombic surface (FIG. 9). Seen in cross-section in FIG. 10, the bars 13 or the diagonal bars 150 in the lower chord are connected with the bars 17 or the diagonal bars 150 in the upper chord by vertical bars 40.

It is noted that such a ladder-type three-dimensional framework can be modified in departure from the illustrative embodiment and can be provided further with solar collectors across its entire southward side. In such a case, merely the sets of diagonal bars 150 need being interconnected.

Al already fundamentally stressed above, the design of the invention, in addition to the already discussed advantages, also offers the feasibility of integrating the solar collectors in an especially advantageous manner (both with respect to construction and economy) not only in the overall construction but also with the roofing, as can be seen in detail especially in FIGS. 4 through 7. Thus, FIG. 4 shows the arrangement of the solar collectors 18 in the construction space between the plane O of the upper chord and the plane U of the lower chord of the framework with construction components 21, 22, 23 below the framework and sealing off the space. In FIG. 5 the solar collectors 18 form part of the weather-skin, functioning in concert with a special sheet metal roofing 24, whereby a gutter for draining precipitation is achieved in the lower region where this gutter can also be used for access for maintenance of the solar collectors 18.

Lastly, FIG. 6 shows a variation, in which, unlike the case for FIGS. 4 and 5, the three-dimensional framework is asymmetrical. Opposite the optimally arrayed solar collectors 18 are the roof slabs or plates 25, which are so designed and mounted as to transmit diffuse daylight to the roofed space below, but not direct sunlight. In this manner, one achieves favorable illumination of the roofed space with daylight while keeping out the undesired solar irradiation. In this case, both the solar collectors 18 and the roof plates 25 and the rain gutters 26 may be made with or without heat barriers, depending on the nature of the buildings. The arrangement of the solar collectors in FIG. 7 in principle is that of FIG. 4, except that in this figure there are no uni-axially clamped triangular trusses arranged in mutual offset; rather there is a framework clamped along two axes which in addition to the lower chord bars 13 also comprises upper chord bars 19 between the upper chord junctions 16 in plane O of the upper chord. As in FIG. 4, the actual space sealing 21, 22, 23 here also is located below the plane U of the lower chord.

It is significant to the economy of construction that such a framework design can be mounted not only horizontally and above a space, but also at a slant to the horizontal or vertically. This means that the framework construction of the present invention can also be applied as a vertical or slanted support skeleton, e.g., for sports arenas, meeting halls or the like. All the inventive principles treated herein furthermore apply not only to two-tiered frameworks, but also to constructions with a larger number of tiers.

What is claimed is:

1. In a roof construction for buildings, particularly buildings which do not have a north-south alignment, comprising a space framework formed by rods and knot elements, with first rods in a top chord and second rods in a bottom chord and diagonal rods connecting said first and second rods, whereby the diagonal rods are arranged in groups in a plurality of intersecting planes, running oblique to the horizontal, and the intersecting planes including the diagonal rods are arranged in groups that are parallel to each other, the improvement characterized in that:

a section of planes, which include groups of diagonal rods of the space framework (33, 35, 36) is aligned independent of the alignment of the buildings (5, 30, 31, 41) in the direction of the highest position of the sun, and solar collectors (18) are arranged in said planes and mounted on the diagonal rods wherein the framework (33,35,36) is deformed on condition that for sets of rods (15,150) pointing in the direction of the highest elevation of the sun and with parallel upper chord axes, the junctions (14) of the lower chord form a grid with grid lines (34) parallel to the building contours and presenting essentially uniform spacings ($L_a, L_b$) along each axis 2. Roof construction as in claim 1, characterized in that, with a plate space framework, space-enclosing roof elements (21, 24, 25, 26) and said solar collectors (18) are found on groups of diagonal rods (15).

3. Roof construction as in claims 1 or 2, characterized in that the diagonal rod groups supporting the solar collectors (18) are so arranged in horizontal spacing from each other that shadow formation is impossible.

4. Roof construction as in claims 1 or 2, characterized in that the solar collectors (18) are provided each on one side of parallel triangular girders (10) of the space framework.

5. Roof construction as in claim 2, characterized in that all of the space-enclosing elements (21, 22, 23) including a heat-insulating layer (23) which determines the climate beneath the roof construction, are arranged beneath the supporting space framework.

6. Roof construction as in claim 2, characterized in that the solar collectors (18) form a part of the space-enclosing roof cover (24).

7. Roof construction as in claim 1, characterized in that the diagonal rod groups supporting solar collectors (18) are arranged at different levels and are so provided with rods (17) in horizontal planes that a series of stages of groups of rods is formed.

8. Roof construction as in claim 1, characterized in that with buildings (30, 31, 41) which do not have north-south alignment, the space framework (33, 35, 36) is offset such that the knot elements (14) connecting the rods of the bottom chord form a raster with essentially the same spaces ($L_a$, $L_b$) in each axis.

9. Roof construction as in claim 1, characterized in that within the space defined by space framework (33, 35, 36) are found devices (28) connected with the solar collectors (18) for use of the solar energy.

* * * * *